3,185,730
ORGANOFLUORO BORATES AND BORANES
Steward L. Stafford, Morris Township, Morris County, N.J., assignor to Allied Chemical Corporation, New York, N.Y., a corporation of New York
No Drawing. Filed Aug. 31, 1962, Ser. No. 220,908
13 Claims. (Cl. 260—543)

This invention relates to organotrifluoroborates, particularly potassium vinyltrifluoroborate, $$K^+CH_2=CHBF_3^-$$

and potassium methyltrifluoroborate, $K^+CH_3BF_3^-$, and to processes for making the same.

Vinyldifluoroborane, $CH_2=CHBF_2$, B.P. minus 39° C., M.P. minus 133° C. is a known compound which may be prepared in known manner, e.g. by reaction of $(CH_2=CH)_4$ Sn and boron trifluoride, $BF_3$. Methyldifluoroborane, $CH_3BF_2$, B.P. minus 62° C., M.P. minus 130° C. is also a known compound which may be made in known manner, e.g. by reaction of $(CH_3BO)_3$ and $BF_3$. These compounds, containing the $BF_2$ radical, are useful as polymerization promoters or catalysts. $CH_2=CHBF_2$ and $CH_3BF_2$ are highly chemically reactive, but are subject to the disadvantages of instability. $CH_2=CHBF_2$ hydrolyzes markedly under normal conditions to $H_3BO_3$, HF and ethylene, and also, but to a lesser degree, $CH_3BF_2$ hydrolyzes readily under normal conditions to HF and $CH_3B(OH)_2$. Moreover, vinyldifluoroborane and the methyldifluoroborane are characterized by the further disadvantage in that each compound, because of the processes of preparation, contains substantial amounts of $BF_3$ contaminant, the quantity of which may vary from e.g. 1 to 10% by weight of the respective compounds. Previously, no convenient method has been known for removal of the $BF_3$ contaminant.

Objects of the invention include provision of new compounds, particularly potassium vinyltrifluoroborate and potassium methyltrifluoroborate, processes for making the same, processes for maintaining and storing vinyldifluoroborane and methyldifluoroborane in stable form, and also to procedures for the production of substantially pure vinyldifluoroborane and methyldifluoroborane.

While the potassium cation of the new compounds may be replaced by cesium and rubidium, since the preferred new compounds are potassium vinyltrifluoroborate and potassium methyltrifluoroborate, for convenience the invention is described mostly in connection with the preferred potassium vinyltrifluoroborate and potassium methyltrifluoroborate, and processes for making the same. Accordingly, products of the invention may be defined as $M^+RBF_3^-$ in which M is a metal selected from the group consisting of potassium, cesium and rubidium, and R is a radical selected from the group consisting of $CH_2=CH$ and $CH_3$. The preferred organic starting materials of the invention are the vinyl difluoroborane, $CH_2=CHBF_2$, and the methyldifluoroborane, $CH_3BF_2$, which compounds may be defined as $RBF_2$, in which R is as before, namely, a radical selected from the group consisting of $CH_2=CH$ and $CH_3$.

In accordance with the invention, having regard for illustrative purposes particularly to production of potassium vinyltrifluoroborate, it has been found that when vinyldifluoroborane $CH_2=CHBF_2$, is contacted with a solution, preferably aqueous, of potassium fluoride under certain reaction and temperature conditions, there is formed a compound recoverable from the reaction mass as a white solid and which has been established to be potassium vinyltrifluoroborate, $K^+CH_2=CHBF_3^-$. It has been found that reactions should be carried out under conditions in which the potassium fluoride solution is maintained in the liquid phase and reaction temperatures are not higher than about 30° C. Accordingly, in the broader process aspects of the invention, the latter is directed to making $M^+RBF_3^-$, in which M is a metal selected from the group consisting of potassium, cesium and rubidium, and R is a radical selected from the group of $CH_2=CH$ and $CH_3$, by technique including contacting $RBF_2$ with a solution of MF, in which M is as before, at temperature at which such solution is maintained in liquid phase and not higher than about 30° C. to form $M^+RBF_3^-$, and recovering the latter from the resulting reaction mass.

More specifically, with respect to production of $$K^+CH_2=CHBF_3^-$$

from $CH_2=CHBF_2$, procedural steps comprise contacting $CH_2=CHBF_2$ in a suitable reactor with preferably an aqueous solution of potassium fluoride maintained at temperature high enough to keep the solution in liquid phase, but not higher than about 30° C. to thereby effect formation of $K^+CH_2=CHBF_3^-$ as a solid in the reaction mass. The latter is then stripped of any incidental quantities of ethylene and dehydrated under conditions such as to maintain the material in the reactor preferably at approximately the same temperature of reaction, but in any case at temperature not in excess of about 30° C. On completion of dehydration, there remains in the reactor the sought-for $K^+CH_2=CHBF_3^-$ product in the form of a white solid along with other solids usually comprising a mixture of KF and $KBF_4.K^+CH_2=CHBF_3^-$ may be separated from other solids by means of a suitable extractant such as acetonitrile. Extraction effects solution in the extractant of $K^+CH_2=CHBF_3^-$, leaving as solid undissolved residue any KF or $KBF_4$ which may have been present in the original reaction mass. On cooling of the extracting liquor, $K^+CH_2=CHBF_3^-$ crystallizes out, and on suitable drying $K^+CH_2=CHBF_3^-$ is recovered as a white solid.

Contacting of $CH_2=CHBF_2$ starting material with potassium fluoride solution may be effected in any suitable way, preferably in an atmosphere consisting of the reactants. While an inert gas may be present, preferably air should be excluded. Apparatus may comprise a reactor of the bomb type, adapted to be submerged in a refrigerating bath and provided with valved equipment facilitating initial charging of the reactor, connection of same with vacuum apparatus, and for discharge of solid reaction products.

Potassium fluoride is supplied to the process preferably in the form of an aqueous solution. Aqueous solutions preferably containing KF substantially in the range of 20 to 50% by weight of KF may be employed. Aqueous KF solutions of the type indicated remain in liquid phase at temperatures down to about minus 16–20° C. In accordance with the invention, it has been found that when $CH_2=CHBF_2$ is brought into contact with KF in aqueous solution under the temperature conditions herein stated, $CH_2=CHBF_2$ and KF appear to react substantially spontaneously to form $K^+CH_2=CHBF_3^-$. Since $$CH_2=CHBF_2$$

is a gas at normal conditions, it is convenient to charge requisite proportions of KF and $CH_2=CHBF_2$ into a reactor by first introducing the KF solution, reducing the temperature of the reactor and the KF solution to well below the boiling point of $CH_2=CHBF_2$, evacuating, and then condensing into the reactor the desired amount of $$CH_2=CHBF_2$$

sealing the reactor and thereafter immersing the reactor in a bath the normal temperature of which lies somewhere in the range of above the melting point of the particular aqueous KF solution used and about 30° C. Some substantial time may be needed to warm up the reactor and contents to the temperature of the refrigerating bath. It appears that when temperature in the reactor rises to above the melting point of the particular aqueous KF solution used and the latter is converted to the aqueous phase, reaction of KF and $CH_2=CHBF_2$ is substantially spontaneous. Other suitable techniques for contacting $CH_2=CHBF_2$ with KF may be employed, such as bubbling $CH_2=CHBF_2$ into a KF solution.

It has been found that, as long as the aqueous solution is maintained in a liquid phase, the lower the temperature the better and more complete is the reaction with minimized loss of $CH_2=CHBF_2$ to ethylene. Accordingly, in the better embodiments reaction temperatures are held below about 20° C., and preferably substantially in the range of minus 15° C. to plus 10° C. and more desirably in the range of minus 15° C. to zero degrees C.

Molecular proportions of KF to $CH_2=CHBF_2$ charged to the reactor are variable to some extent. Theoretical proportions are believed to be about one to one. Desirably, at least one molecular proportion of KF per mol of $CH_2=CHBF_2$ should be utilized. Further, since as above indicated, available $CH_2=CHBF_2$ is almost always contaminated with appreciable amounts of $BF_3$, in general it is more desirable to charge to the reaction a molecular excess of KF, preferably KF in amount at least 1.5 mol proportions per mol proportion of $CH_2=CHBF_2$. In the better embodiments, it is preferred to use KF in amount at least 1.5 mol proportions per mol proportion of $CH_2=CHBF_2$ plus any further amount of KF which may be needed to provide for conversion of substantially all of the $BF_3$ contaminant to $KBF_4$, a solid.

Following termination of reaction, the mass in the reactor may be stripped of incidental ethylene and dehydrated in any suitable manner provided temperature is held at not more than 30° C. and preferably not more than 20° C. Usually, dehydration is effected at temperatures substantially the same as that of reaction. Ethylene stripping and dehydration may be effected conveniently by connecting the reactor with a vacuum system which may be operated under high vacuum of less than one mm. of Hg. In this amnner, thorough dehydration may be effected without appreciable temperature rise of the solid material in the reactor. Depending more or less on the scale of operation, dehydration may require from 1 to 6 hrs. End point of dehydration may be determined by cessation of collection of $H_2O$ condensate in e.g. a Dry Ice trap.

On completion of dehydration, the solid material in the reactor may be suitably treated therein or in another vessel to extract $K^+CH_2=CHBF_3^-$ product and effect separation thereof from other solids e.g. $KBF_4$ or a mixture of the latter and KF. The extractant employed may be a Lewis base of moderate solvent power e.g. low molecular weight nitriles such as acetonitrile, propionitrile, acrylonitrile, and butyrylnitrile. Extraction of $K^+CH_2=CHBF_3^-$ from other solids left in the reactor after dehydration, and solubilizing of $K^+CH_2=CHBF_3^-$ may be easily effected by boiling the dehydrated solid material from the reactor in several portions of 3 to 5 volumes of acetonitrile based on the volume of reactor solids. Boiling time per portion may be 2–3 minutes.

Following extraction, the extracting liquor may be filtered while hot to separate out undissolved solids which are generally mixtures of $KBF_4$ and KF. On cooling the filtrate to about room temperature or below as in an ice bath, a white solid crystallizes out. This solid may be filtered out of the liquor, and dried as by vacuum pumping on the solid at room temperature at pressure below one mm. of Hg.

By the following analytical work, the white solid material recovered substantially as above, and specifically as made and recovered in appended Example 1, has been determined to be $K^+CH_2=CHBF_3^-$. The compound is stable at room temperature, is very soluble in water, and may be recovered intact on removal of water.

*Elemental analysis.*—Required for $C_2H_3F_3BK$: C, 17.9; H, 2.2; F, 42.5; K, 29.1; B, 8.2. Found: C, 17.6; H, 2.6; F, 39.3; K, 31.2; B, 7.7.

The infrared spectrum (KBr disc) of the compound shows absorptions at 2995, 2935 (C–H stretch); 1645 (C=C stretch); 1420, 1289 ($CH_2$ and CH in-plane deformations); 1128, 1104 (B–C stretch); 1033 (B–F asymmetric stretch); 950–920 (broad, strong and featureless—probably overlapping of B–F symmetric stretch and $CH_2$ and CH out-of-plane deformations); and 694 cm.$^{-1}$. The position of the C=C stretch may be compared with that in $CH_2=CHBF_2$ (1629 cm.$^{-1}$) or $$CH_2=CHBCl_2 \cdot N(CH_3)_3$$

(1613 cm.$^{-1}$). The shift to higher frequency is a result of the high basicity of the fluoride ion. (The "normal" C=C stretching region, in the absence of any carboncarbon $\pi$-bonding, may be considered to be near 1650 cm.$^{-1}$, as in $CH_2=CHCH_2BF_2$.) The F–19 nuclear magnetic resonance spectrum, in aqueous solution, consists of a quartet centered at $\delta_{CCl_3F}=138$ p.p.m., with $$J_B11_{-F}=51.8 \text{ c.p.s.}$$

thus establishing the presence of the boron-fluorine bonds, and the $RBF_3^-$ structure.

Using methyldifluoroborane, $CH_3BF_2$, as starting material, potassium methyltrifluoroborate, $K^+CH_3BF_3^-$, may be made by substantially the same procedural techniques as described above. Appended Example 3 illustrates production, from $CH_3BF_2$ starting material, of a white solid material established to be $K^+CH_3BF_3^-$.

In accordance with another aspect of the invention, it has been found that the new metal salt products may be readily decomposed to produce substantially pure corresponding starting materials, e.g. $CH_2=CHBF_2$ and $CH_3BF_2$. Such decomposition may be effected in any suitable vessel equipped for external heating and with facilities for recovering off-gas of the heating step to the exclusion of moisture and air. Most convenient procedure is to recover off-gas from the heating vessel by means of a vacuum line.

It has been found, as illustrated in Example 5, that $K^+CH_2=CHBF_3^-$ shows no tendency to melt at temperature below about 225° C. At temperature above about 250° C. the $K^+CH_2=CHBF_3^-$ decomposes rapidly, tests showing that the off-gas is substantially pure $CH_2=CHBF_2$, it having been found that any relatively small amounts of $KBF_4$ and/or KF which may have been contained in the salt subjected to decomposition remain stable solid salts and do not decompose at the temperature of decomposition of $K^+CH_2=CHBF_3^-$. During decomposition of $K^+CH_2=CHBF_3^-$, decomposition temperature preferably should not exceed about 300° C. in order to avoid possible decomposition of KF or $KBF_4$ and insure retention of these compounds in the heating vessel in the solid state.

Appended Example 4 illustrates production of substantially pure $CH_3BF_2$ by decomposition of the $K^+CH_3BF_3^-$ salt. It has been found that $K^+CH_3BF_3^-$ melts nor decomposes to no appreciable extent at temperature below about 250° C., while at higher temperature of about 275–300° C. decomposition is rapid, and off-gas of the heating operation is substantially pure $CH_3BF_2$. For decomposition of $K^+CH_3BF_3^-$, an upper temperature of about 300–325° C. is desirable to avoid decomposition of KF and $KBF_4$.

The invention accordingly provides processes for making stable compounds from unstable starting material thus facilitating storage and shipment of unstable compounds conveniently as stable solids. Additionally, the invention affords means for making substantially pure $CH_2=CHBF_2$ and $CH_3BF_2$ at a point of use by simple and economical procedure which may entail only disposal of relatively low-priced metal fluoride.

The following examples illustrate practice of the invention. The vinyldifluoroborane, $CH_2=CHBF_2$ employed was crude material prepared in known manner by reaction of $(CH_2=CH)_4Sn$ and $BF_3$, and contained some $BF_3$ as contaminant. The methyldifluoroborane, $CH_3BF_2$, utilized was also a crude product made in known manner by reaction of $(CH_3)_4Sn$ and $BF_3$ and likewise contained some $BF_3$ as impurity.

*Example 1.*—A solution of about 2.59 g. (27.5 mmoles) of $KF.2H_2O$ dissolved in about 3 ml. of water was introduced into a glass reaction tube. For convenience in bringing together the KF in aqueous solution and impure $CH_2=CHBF_2$, about 560 cc. (25 mmoles) (STP) of the latter were condensed into the evacuated tube at temperature of liquid nitrogen. The tube was sealed and placed in an aqueous NaCl/ice bath. In about two hours, the tube was warmed to the normal temperature of the bath i.e. approximately in the range of minus 10 to zero degrees C., and the previously solidified aqueous KF solution reliquefied. When the aqueous KF solution reached liquid phase, reaction apparently took place spontaneously or approximately so. The tube was opened, and placed under a high vacuum of about 0.01 mm. of Hg, and volatile products were removed from the tube under the vacuum through traps held at about minus 78° C. and about minus 196° C. respectively. The only volatiles removed were water, and about 56 cc. (STP) of ethylene, B.P. minus 103° C., which were collected in the minus 196° C. trap. Formation of the ethylene is believed attributable to minor hydrolysis of

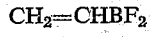

prior to completion of reaction of the same with the KF. Ethylene stripping and dehydration were carried out under low pressure conditions so that material in the reaction tube was maintained at temperature about the same as that of the reaction, i.e. minus 10° C. to zero degrees C. Subsequent to ethylene stripping and dehydration, the solid material in the tube, amounting to about 3.2 g., was treated with about 40 cc. of acetonitrile, B.P. 81° C., in portions of 5–10 ml. each. The mixture of solids and acetonitrile was boiled for about 3–5 min. per portion to effect extraction of the $K^+CH_2=CHBF_3^-$ product from the solid residue and to solubilize the product in the acetonitrile. On completion of extraction and separation of solution from undissolved residue, there was obtained about one gram of insoluble material, a mixture of KF and $KBF_4$. On cooling of the extract liquor to about zero ° C., a white solid crystallized out, and there were recovered about 1.84 g. of material identified, as herein demonstrated, to be $K^+CH_2=CHBF_3^-$ which was better than about 95% pure. Yield of the latter, based on the crude $CH_2=CHBF_2$ charged was about 55% of theory.

*Example 2.*—Procedural techniques were substantially the same as in Example 1. About 96 mmoles of $CH_2=CHBF_2$, containing considerable $BF_3$ as impurity, were condensed into about 100 mmoles of $KF.2H_2O$ dissolved in about 10 ml. of water contained in a 100 ml. stopcock fitted flask, which, when closed, was immersed in an ice-acetone mixture. Warming up time to substantially in the range of minus 10° C. to zero degrees C. was about 90 minutes. On opening of the reactor, about 167 cc. of ethylene were recovered. After dehydration of the material in the flask under high vacuum as in Example 1, followed by extraction by boiling in several portions of about 10 cc. of acetonitrile, about 5.4 g. of white solid insoluble residue, a mixture of KF and $KBF_4$, remained. After cooling of the solvent and recovery of crystallized solid, about 5.6 g. (42 mmoles) of solid identified to be $K^+CH_2=CHBF_3^-$ were recovered, equivalent to a 44% of theory yield based on the crude $CH_2=CHBF_2$ charged. About 40 mmoles of $KBF_4$ were present in the insoluble residue remaining after extraction. On this basis, the quantity of $CH_2=CHBF_2$ present in the starting material was not more than about 56 mmoles, and yield on the basis of $CH_2=CHBF_2$ charged was not less than about 75%.

*Example 3.*—Procedural techniques were substantially the same as in Example 1. About 26 mmoles of $CH_3BF_2$ containing some $BF_3$ contaminant were condensed into a solution of about 27 mmoles of $KF.2H_2O$ in about 2.6 ml. of water in a reactor tube. The tube was sealed and placed in an ice-water acetone mixture. Warming up time to temperature substantially in the range of minus 10° C. to zero degrees C. was about 100 minutes. The tube was opened and connected to the vacuum system. No volatile material other than water was removed from the tube. The solid material left in the tube was subjected to extraction by boiling in about 50 cc. of acetonitrile in portions. After separation of the extract liquor from undissolved residue, cooling of the extract liquor to about zero ° C. to effect crystallization of soluble material contained in the extract liquor, there was recovered, on separation of crystallized material from the liquor, a white solid which on the basis of the following analysis was found to be $K^+CH_3BF_3^-$.

*Elemental analysis.*—Calcd.: C, 9.84; H, 2.46; F, 46.7; K, 32.0; B, 9.02. Found: C, 9.43; H, 2.63; F, 46.8; K, 33.1; B, 10.7

The F, 19 nuclear magnetic resonance spectrum, in aqueous solution showed a quartet at $\delta_{CCl_3F}=+132$ p.p.m. as would be expected for $K^+CH_3BF_3$. The infrared spectrum was also in complete accord with $K^+CH_3BF_3^-$.

*Example 4.*—A sample of the dry $K^+CH_3BF_3^-$ product of Example 3 was externally heated under vacuum of about 0.01 mm. of Hg. The solid did not melt below about 250° C. at which temperature, decomposition of the salt began. Decomposition was rapid at temperature above about 275° C. The gas evolved was shown by infrared analysis to be high purity $CH_3BF_2$. The residue in the heated vessel was a mixture of KF and $KBF_4$.

*Example 5.*—A sample of dry $K^+CH_2=CHBF_3^-$ obtained in accordance with the procedure of Example 1 was heated under vacuum similarly as in Example 4. The solid did not melt below about 225° C. at which temperature decomposition of salt began. Decomposition was rapid at temperature above 250° C. The off-gas was subjected to infrared analysis, and found to be high purity $CH_2=CHBF_2$. The residue in the heating vessel was a mixture of KF and $KBF_4$.

I claim:

1. The compound $MRBF_3$ in which M is a metal selected from the group consisting of potassium, cesium and rubidium, and R is a radical selected from the group consisting of $CH_2=CH$ and $CH_3$.

2. The compound $K^+CH_2=CHBF_3^-$.

3. The compound $K^+CH_3BF_3^-$.

4. Process for making $M^+RBF_3^-$ in which M is a metal selected from the group consisting of potassium, cesium and rubidium, and R is a radical selected from the group consisting of $CH_2=CH$ and $CH_3$ which process comprises contacting $RBF_2$ with an aqueous solution of MF at temperature at which said solution is maintained in liquid phase but not higher than about 30° C. to form $M^+RBF_3^-$, and recovering $M^+RBF_3^-$ from the resulting reaction mass.

5. Process for making $M^+RBF_3^-$ in which M is a metal selected from the group consisting of potassium, cesium and rubidium, and R is a radical selected from the group consisting of $CH_2=CH$ and $CH_3$ which process comprises contacting $RBF_2$ with an aqueous solution of MF at temperature at which said solution is maintained in liquid phase but not higher than about 30° C. to form $M^+RBF_3^-$, substantially dehydrating the resulting reaction mass while maintaining the same at temperature not higher than about 30° C., and recovering $M^+RBF_3^-$ from the resulting solid dehydrated material.

6. The process of claim 5 in which reaction temperature is substantially in the range of minus 15° C. to plus 10° C.

7. Process for making $K^+CH_2=CHBF_3^-$ which comprises contacting $CH_2=CHBF_2$ with an aqueous solution of KF at a temperature substantially in the range of minus 15° C. to plus 10° C., in liquid phase, to form $K^+CH_2=CHBF_3^-$, substantially dehydrating the resulting reaction mass while maintaining the same at a temperature not higher than about 20° C. and recovering $K^+CH_2=CHBF_3^-$ from the resulting dehydrating material.

8. Process for making $K^+CH_3BF_3^-$ which comprises contacting $CH_3BF_2$ with an aqueous solution of KF at a temperature substantially in the range of minus 15° C. to plus 10° C., in liquid phase, to form $K^+CH_3BF_3^-$, substantially dehydrating the resulting reaction mass while maintaining the same at a temperature not higher than about 20° C., and recovering $K^+CH_3BF_3^-$ from the resulting dehydrating material.

9. Process for making substantially pure $RBF_2$ in which R is a radical selected from the group consisting of $CH_2=CH$ and $CH_3$ which process comprises contacting $BF_3$-contaminated $RBF_2$ with an aqueous solution of MF, in which M is a metal selected from the group consisting of potassium, cesium and rubidium, said MF being present in amount at least one molecular proportion per molecular proportion of $RBF_2$, at temperature at which said solution is maintained in liquid phase but not higher than about 30° C. to form a reaction mass containing $MRBF_3$ and $MBF_4$, substantially dehydrating the said reaction mass while maintaining the same at temperature not higher than about 30° C., recovering $MRBF_3$ from the resulting dehydrated material, heating said $MRBF_3$ to temperature above the decomposition temperature thereof to form substantially pure gaseous $RBF_2$ and a solid MF residue, and recovering substantially pure $RBF_2$.

10. The process of claim 9 in which MF is present in amount at least 1.5 molecular proportions per molecular proportion of $RBF_2$, and reaction and dehydration temperatures are not higher than about 20° C.

11. Process for making substantially pure $CH_2=CHBF_2$ which comprises contacting $BF_3$-contaminated

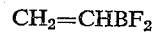

$$CH_2=CHBF_2$$

with an aqueous solution of KF, said KF being present in amount of at least one molecular proportion per molecular proportion of $CH_2=CHBF_2$ at temperature at which said solution is maintained in liquid phase but not higher than about 30° C. to form a reaction mass containing $K^+CH_2=CHBF_3^-$ and $KBF_4$, substantially dehydrating the said reaction mass while maintaining the same at temperature not higher than about 30° C., recovering $K^+CH_2=CHBF_3^-$ from the resulting dehydrated material, heating said $K^+CH_2=CHBF_3^-$ to temperature above the decomposition temperature thereof to form substantially pure gaseous $CH_2=CHBF_2$ and a solid KF residue, and recovering substantially pure $CH_2=CHBF_2$.

12. The process of claim 11 in which KF is present in amount at least 1.5 molecular proportions per molecular proportion of $CH_2=CHBF_2$, reaction temperature is substantially in the range of minus 15° C. to plus 10° C., and dehydration temperature is not higher than about 20° C.

13. Process for making substantially pure $CH_3BF_2$ which comprises contacting $BF_3$-contaminated $CH_3BF_2$ with an aqueous solution of KF, said KF being present in amount of at least one molecular proportion per molecular proportion of $CH_3BF_2$, at temperature at which said solution is maintained in liquid phase but not higher than about 30° C. to form a reaction mass containing $K^+CH_3BF_3^-$ and $KBF_4$, substantially dehydrating the said reaction mass while maintaining the same at temperature not higher than about 30° C., recovering $K^+CH_3BF_3^-$ from the resulting dehydrated material, heating said $K^+CH_3BF_3^-$ to temperature above the decomposition temperature thereof to form substantially pure gaseous $CH_3BF_2$ and a solid KF residue, and recovering substantially pure $CH_3BF_2$.

References Cited by the Examiner

Bartocha et al.: Chem. Abst., vol. 52 (1958), Col. 19914–19915 (2 pages).

Remy: Treatise on Inorganic Chemistry, vol. I, 1956, page 334.

Wiberg et al.: Chem. Abst., vol. 46, 1952, Col. 3443–3444 (1 page).

LEON ZITVER, *Primary Examiner*.